United States Patent
Sarpatwar et al.

(10) Patent No.: US 12,212,651 B2
(45) Date of Patent: Jan. 28, 2025

(54) ENABLING BOOSTING PROTOCOLS ON ENCRYPTED DATA

(71) Applicant: International Business Machines Corporation, Armonk, NY (US)

(72) Inventors: Kanthi Sarpatwar, Elmsford, NY (US); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 16/685,034

(22) Filed: Nov. 15, 2019

(65) Prior Publication Data

US 2021/0150266 A1     May 20, 2021

(51) Int. Cl.
| | |
|---|---|
| *H04L 29/06* | (2006.01) |
| *G06F 18/21* | (2023.01) |
| *G06F 18/214* | (2023.01) |
| *G06F 18/24* | (2023.01) |
| *G06N 20/00* | (2019.01) |
| *H04L 9/00* | (2022.01) |

(Continued)

(52) U.S. Cl.
CPC ............ *H04L 9/008* (2013.01); *G06F 18/214* (2023.01); *G06F 18/217* (2023.01); *G06F 18/24* (2023.01); *G06N 20/00* (2019.01); *H04L 9/0869* (2013.01); *H04L 67/1097* (2013.01)

(58) Field of Classification Search
CPC .... G06K 9/6256; G06N 20/00; H04L 9/0869; G06F 18/217
See application file for complete search history.

(56) References Cited

U.S. PATENT DOCUMENTS

| | | | |
|---|---|---|---|
| 8,925,075 | B2 | 12/2014 | Krendelev |
| 9,519,798 | B2 | 12/2016 | Egorov |
| 9,900,147 | B2 | 2/2018 | Laine |

(Continued)

FOREIGN PATENT DOCUMENTS

| | | |
|---|---|---|
| CN | 108833077 A | 11/2018 |
| CN | 110011784 A | 7/2019 |

(Continued)

OTHER PUBLICATIONS

"The International Search Report and the Written Opinion of the International Searching Authority, or the Declaration", International Application No. PCT/EP2020/078805, International Filing Date: Oct. 13, 2020, Date of Mailing: Dec. 17, 2020, 11 pages.

(Continued)

*Primary Examiner* — Wasika Nipa
(74) *Attorney, Agent, or Firm* — Edward J. Wixted, III

(57) ABSTRACT

In an approach for training machine-learning models using encrypted data, a processor receives a set of encrypted data from a client computing device. A processor trains a machine-learning model using a boosting algorithm. A processor performs a first classification on the set of encrypted data using the machine-learning model. A processor sends a first set of encrypted results of the first classification to the client computing device. A processor receives a first set of boosting updates from the client computing device. A processor applies the first set of boosting updates to the machine-learning model.

16 Claims, 4 Drawing Sheets

(51) Int. Cl.
*H04L 9/08* (2006.01)
*H04L 67/1097* (2022.01)

(56) References Cited

U.S. PATENT DOCUMENTS

| | | | |
|---|---|---|---|
| 10,198,399 B1 * | 2/2019 | Fritchman | G06F 18/24323 |
| 10,289,816 B1 * | 5/2019 | Malassenet | G06F 21/14 |
| 2018/0349740 A1 | 12/2018 | Schneider | |
| 2018/0359078 A1 * | 12/2018 | Jain | G06F 21/602 |
| 2019/0020475 A1 | 1/2019 | Antonatos | |
| 2019/0066133 A1 * | 2/2019 | Cotton | G06F 17/11 |
| 2019/0087689 A1 * | 3/2019 | Chen | H04L 9/0825 |
| 2019/0095756 A1 * | 3/2019 | Agrawal | G06V 10/776 |
| 2019/0140818 A1 | 5/2019 | Bent | |
| 2019/0166030 A1 * | 5/2019 | Chen | H04L 7/042 |
| 2019/0287026 A1 | 9/2019 | Calmon et al. | |
| 2019/0332814 A1 | 10/2019 | Bos | |
| 2019/0347398 A1 * | 11/2019 | Cramer | G06T 17/20 |
| 2020/0126174 A1 * | 4/2020 | Halse | G06Q 50/265 |

FOREIGN PATENT DOCUMENTS

| | | |
|---|---|---|
| CN | 110222527 A | 9/2019 |
| EP | 3461054 A1 | 3/2019 |
| KR | 20190112959 A | 10/2019 |
| KR | 20190115323 A | 10/2019 |
| WO | 2018223077 A1 | 12/2018 |

OTHER PUBLICATIONS

Bost et al., "Machine learning classification over encrypted data." NDSS '15, Feb. 8-11, 2015, San Diego, CA, USA, Copyright 2015 Internet Society,<http://dx.doi.org/10.14722/ndss.2015.23241>, 14 pages.

Cheon et al., "Ensemble Method for Privacy-Preserving Logistic Regression Based on Homomorphic Encryption", EEE Access 2018, <https://ieeexplore.ieee.org/stamp/stamp.jsp?arnumber=8444365>, 11 pages.

Garg et al. "Outsourcing Private Machine Learning via Lightweight Secure Arithmetic Computation." arXiv preprint arXiv:1812.01372 (2018), 12 pages.

Graepel et al., "ML Confidential: Machine Learning on Encrypted Data", ICISC, 2012, <https://www.microsoft.com/en-us/research/wp-content/uploads/2016/02/323.pdf>, 15 pages.

Han et al., "Efficient Logistic Regression on Large Encrypted Data", IAAI 2019, <https://daejunpark.github.io/iaai19.pdf>, 31 pages.

Jaschke et al., "Unsupervised Machine Learning on Encrypted Data", Selected Areas in Cryptography—SAC 2018. SAC 2018. Lecture Notes in Computer Science, vol. 11349. Springer, 30 pages.

Juvekar et al., "Gazelle: A Low Latency Framework for Secure Neural Network Inference", Usenix Security Symposium, Aug. 15-17, 2018 • Baltimore, MD, 19 pages.

Kitai et al. "MOBIUS: Model-Oblivious Binarized Neural Networks", arXiv preprint, arXiv:1811.12028v1, Nov. 29, 2018, 8 pages.

Liu et al. "Oblivious neural network predictions via minionn transformations", Proceedings of the 2017 ACM SIGSAC Conference on Computer and Communications Security. ACM, 2017, 13 pages.

Nikolaenko et al., "Privacy-Preserving Ridge Regression on Hundreds of Millions of Records", ISSP 2013, <http://ece.neu.edu/fac-ece/ioannidis/static/pdf/2013/Garbled-Oakland2013-Final.pdf>, 7 pages.

Orlandi et al., "Oblivious Neural Network Computing via Homomorphic Encryption", Hindawi Publishing Corporation EURASIP Journal on Information Security vol. 2007, Article ID 37343, doi:10.1155/2007/37343, 11 pages.

Zeng, Qiang, "Efficient Computation and FPGA implementation of Fully Homomorphic Encryption with Cloud Computing Significance." , University of Windsor Dec. 20, 2018, Electronic Theses and Dissertations, 99 pages.

"Notice of Reasons for Refusal", Application number: Japanese Patent Application No. 2022-523580, Date of Drafting: May 7, 2024, 5 pgs.

The State Intellectual Property Office of People's Republic of China, "The First Office Action", Application No. or Publication No. 202080078512.3, May 24, 2024, 6 pgs.

"Access Database Foundation and Application Tutorial Learning Guidance", Jersey, Machine Industry Press, Jan. 31, 2014, pp. 151-153.

European Patent Office, "Communication pursuant to Article 94(3) EPC" Nov. 15, 2024, 4 pages, EP Application No. 20792610.6.

The State Intellectual Property Office of People's Republic of China, "The Second office action," Oct. 22, 2024, 14 Pages, CN Application No. 202080078512.3.

* cited by examiner

ENABLING BOOSTING PROTOCOLS ON ENCRYPTED DATA

BACKGROUND

The present invention relates generally to the field of encrypted data, and more particularly to enabling boosting protocols on encrypted data.

Data encryption translates data into another form, or code, so that only people with access to a secret key (formally called a decryption key) or password can read it. Encrypted data is commonly referred to as ciphertext, while unencrypted data is called plaintext. Currently, encryption is one of the most popular and effective data security methods used by organizations. Two main types of data encryption exist: asymmetric encryption, also known as public-key encryption, and symmetric encryption. The purpose of data encryption is to protect digital data confidentiality as it is stored on computer systems and transmitted using the internet or other computer networks.

Homomorphic encryption is a form of encryption with an additional evaluation capability for computing over encrypted data without access to the secret key. The result of such a computation remains encrypted. Homomorphic encryption can be viewed as an extension of either symmetric-key or public-key cryptography. Homomorphic encryption can be used for privacy-preserving outsourced storage and computation. This allows data to be encrypted and outsourced to commercial cloud environments for processing all while encrypted. In highly regulated industries, such as health care, homomorphic encryption can be used to enable new services by removing privacy barriers inhibiting data sharing. For example, predictive analytics in health care can be hard to apply due to medical data privacy concerns, but if the predictive analytics service provider can operate on encrypted data instead, these privacy concerns are diminished.

SUMMARY

Aspects of an embodiment of the present invention disclose a method, computer program product, and computer system for training machine-learning models using encrypted data. A processor receives a set of encrypted data from a client computing device. A processor trains a machine-learning model using a boosting algorithm. A processor performs a first classification on the set of encrypted data using the machine-learning model. A processor sends a first set of encrypted results of the first classification to the client computing device. A processor receives a first set of boosting updates from the client computing device. A processor applies the first set of boosting updates to the machine-learning model.

DETAILED DESCRIPTION

Embodiments of the present invention recognize that clients want to protect their private data and cloud platform operators want to protect their intellectual property, i.e., machine-learning models. Thus, there is a need to be able to train the machine-learning models on encrypted data without the decryption key. Homomorphic encryption has emerged as a technique for enabling computing functions on encrypted data but applying homomorphic encryption to complex problems is highly inefficient, e.g., machine-learning training of a complex deep neural network. Embodiments of the present invention enable training of complex machine-learning models on encrypted data, e.g., homomorphically encrypted data.

Embodiments of the present invention propose using simpler models, e.g., logical regression, and utilizing boosting protocols under strong privacy and computational constraints. Embodiments of the present invention ensure that client data is never decrypted by a cloud platform and cloud platform models are never revealed to a client. Embodiments of the present invention utilize the cloud platform to do most of the computational heavy lifting. Embodiments of the present invention support several state-of-the-art machine-learning ensemble meta-algorithms, e.g., boosting algorithms, including adaptive boosting, gradient boosting, and voting methodology.

In an embodiment of the present invention, a client owns highly confidential data that cannot be shared in its raw form. The client is willing to share the highly confidential data with a cloud platform as homomorphically encrypted data that cannot be decrypted. The cloud platform performs certain computations, i.e., diagnostics, model training, inference, etc., on the homomorphically encrypted data. The cloud platform models contain intellectual property that is confidential to the cloud platform. The cloud platform can send encrypted results back to the client, on which the encrypted results can be decrypted.

Figure 1:
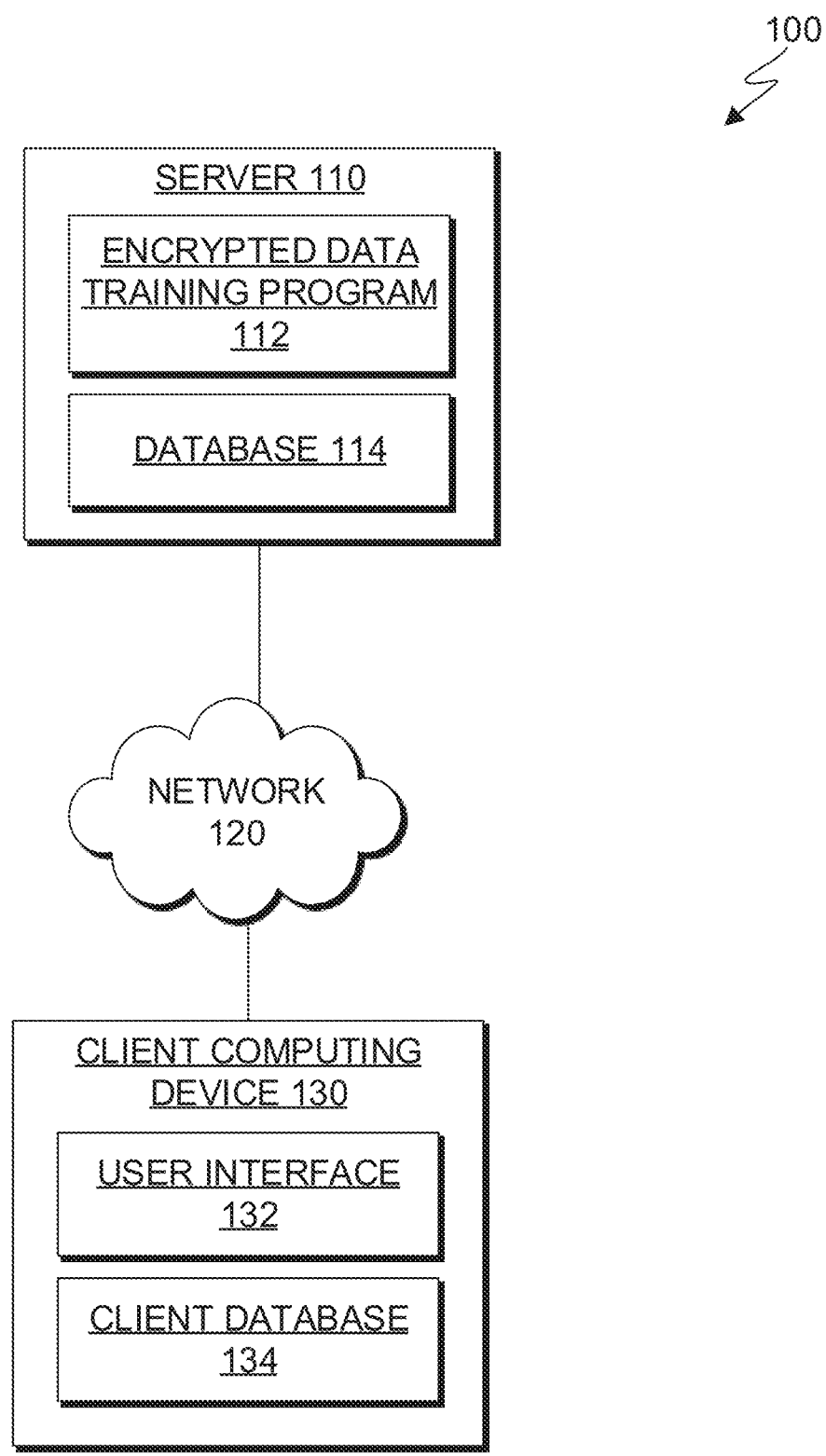
FIG. 1 depicts a block diagram of a distributed data processing environment, in accordance with an embodiment of the present invention.

The present invention will now be described in detail with reference to the Figures. FIG. 1 depicts a functional block diagram illustrating distributed data processing environment 100, in accordance with an embodiment of the present invention. FIG. 1 provides only an illustration of one embodiment of the present invention and does not imply any limitations with regard to the environments in which different embodiments may be implemented. In the depicted embodiment, distributed data processing environment 100 includes server 110 and client computing device 130 interconnected over network 120. Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server 110 and client computing device 130. Distributed data processing environment 100 may include additional servers, computers, or other devices not shown.

Server 110 operates to run encrypted data training program 112 and store and/or send data using database 114. In the depicted embodiment, server 110 houses encrypted data training program 112 and database 114. In other embodiments (not shown), encrypted data training program 112 and database 114 may be housed on separate computing devices.

In some embodiments, server 110 represents a server computing system utilizing multiple computers as a server system, such as in a cloud computing environment, e.g., a private or public cloud platform. In some embodiments, server 110 may be a management server, a web server, or any other electronic device or computing system capable of receiving and sending data. In some embodiments, server 110 may be a laptop computer, tablet computer, netbook computer, personal computer (PC), a desktop computer, a smart phone, or any programmable electronic device capable of communicating with client computer device 130 via network 120. Server 110 may include components as described in further detail in FIG. 4.

Encrypted data training program 112 operates as a program for training machine-learning models on encrypted data. In an embodiment, encrypted data training program 112 receives encrypted data. In an embodiment, encrypted data training program 112 trains machine-learning model using boosting algorithm. In an embodiment, encrypted data training program 112 performs classification on encrypted data. In an embodiment, encrypted data training program 112 sends encrypted results to client. In an embodiment, encrypted data training program 112 receives boosting updates from client. In an embodiment, encrypted data training program 112 applies the boosting updates to the machine-learning model. In the depicted embodiment, encrypted data training program 112 resides on server 110. In other embodiments, encrypted data training program 112 may reside on another computing device (not shown), provided that encrypted data training program 112 has access to network 120.

Database 114 operates as a repository for data received, used, and/or output by encrypted data training program 112. Data received, used, and/or generated by encrypted data training program 112 may include, but is not limited to, encrypted data, homomorphically encrypted data, and encrypted results from machine-learning model. Database 114 can be implemented with any type of storage device capable of storing data and configuration files that can be accessed and utilized by server 110, such as a database server, a hard disk drive, or a flash memory. In an embodiment, database 114 is accessed by encrypted data training program 112 and/or server 110 to store and/or to access the data. In the depicted embodiment, database 114 resides on server 110. In another embodiment, database 114 may reside elsewhere within distributed data processing environment 100, provided that database 114 has access to network 120.

Client computing device 130 operates to run user interface 132 and client database 134. In some embodiments, client computing device 130 may be, but is not limited to, an electronic device, such as a laptop computer, a tablet computer, a netbook computer, a personal computer (PC), a desktop computer, a smart phone, or any programmable electronic device capable of running user interface 132 and communicating (i.e., sending and receiving data) with server 110 and encrypted data training program 112 via network 120. In some embodiments, client computing device 130 represents one or more programmable electronic devices or combination of programmable electronic devices capable of executing machine readable program instructions and communicating with server 110 and/or other computing devices (not shown) within distributed data processing environment 100 via a network, such as network 120. In an embodiment, client computing device 130 represents one or more devices associated with a user. In the depicted embodiment, client computing device 130 includes an instance of user interface 132. Client computing device 130 may include components as described in further detail in FIG. 4.

User interface 132 operates as a local user interface on client computing device 130 through which a user can choose encrypted data to send to encrypted data training program 112 on server 110 to run through a machine-learning model, send boosting updates to encrypted data training program 112, and/or view encrypted results sent by encrypted data training program 112. In some embodiments, user interface 132 is a graphical user interface (GUI), a web user interface (WUI), and/or a voice user interface (VUI) that can display (i.e., visually) or present (i.e., audibly) information (such as graphics, text, and/or sound) sent from encrypted data training program 112 to a user via network 120. In an embodiment, user interface 132 enables a user to choose encrypted data to send to encrypted data training program 112 on server 110 to run through a machine-learning model, send boosting updates to encrypted data training program 112, and/or view encrypted results sent by encrypted data training program 112. In an embodiment, user interface 132 is capable of sending and receiving data (i.e., to and from encrypted data training program 112 via network 120, respectively).

Client database 134 operates as a repository for data received, used, and/or output by client computing device 130. Data received, used, and/or generated by client computing device 130 may include, but is not limited to, private raw data, encrypted data, homomorphically encrypted data, and encrypted results received from encrypted data training program 112. Client database 134 can be implemented with any type of storage device capable of storing data and configuration files that can be accessed and utilized by client computing device 130, such as a database server, a hard disk drive, or a flash memory. In an embodiment, client database 134 is accessed by client computing device 130 to store and/or to access the data. In the depicted embodiment, client database 134 resides on client computing device 130. In another embodiment, client database 134 may reside elsewhere within distributed data processing environment 100, provided that client database 134 has access to network 120.

Figure 2:
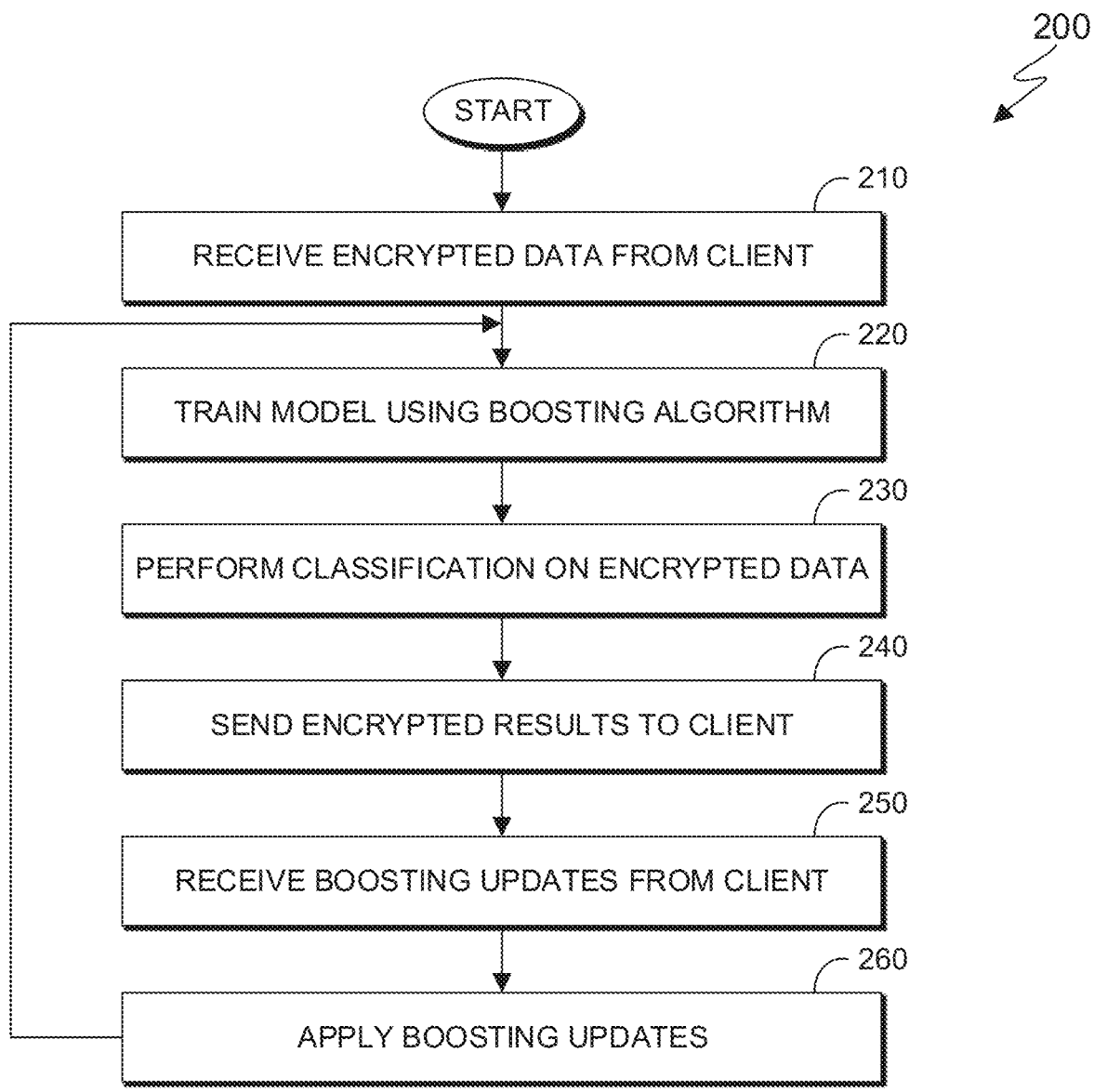
FIG. 2 depicts a flow chart of the steps of an encrypted data training program, in accordance with an embodiment of the present invention.
Figure 3:
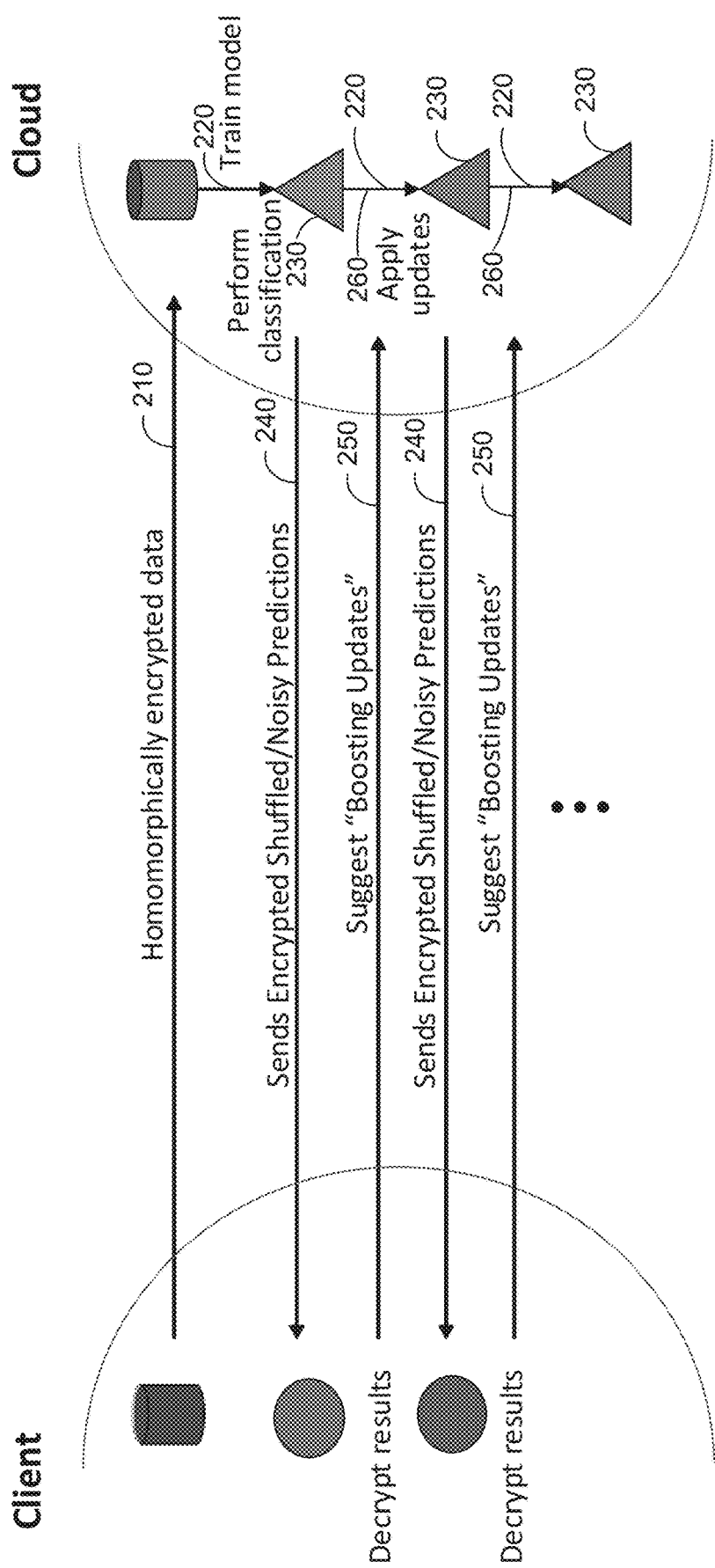
FIG. 3 depicts a flow of data between a client environment and a cloud computing environment, in accordance with an embodiment of the present invention.

FIG. 2 depicts a flowchart 200 of the steps of encrypted data training program 112, in accordance with an embodiment of the present invention. In the depicted embodiment, encrypted data training program 112 receives a set of encrypted data, trains machine-learning model using boosting algorithm, performs classification on encrypted data, sends encrypted results to client, receives boosting updates from client, and applies the boosting updates to the machine-learning model. It should be appreciated that the process depicted in FIG. 2 illustrates one possible iteration of the process flow, which repeats for each set of encrypted data received by encrypted data training program 112. FIG. 3 depicts a flow of data between a client environment and a cloud computing environment during encrypted data training program 112, in accordance with an embodiment of the present invention.

In step 210, encrypted data training program 112 receives encrypted data from client. In an embodiment, encrypted data training program 112 of a cloud computing environment receives encrypted data from a client as shown in FIG. 3. In an embodiment, encrypted data training program 112 receives encrypted data from client computing device 130. In an embodiment, encrypted data training program 112 receives a homomorphic encryption instance (sk, pk)←KeyGen($\lambda$, $\tau$), in which $\lambda$ and $\tau$ are security parameters, that is generated by the client through user interface 132 on client computing device 130. In an embodiment, encrypted data training program 112 receives a public key pk from the client through user interface 132 on client computing device 130. In an embodiment, the private key sk is kept by the client in client database 134 on client computing device 130. In an embodiment, encrypted data training program 112 enables the client through user interface 132 to encrypt a set of data D using the public key pk to generate $D_{enc} \leftarrow \text{Encrypt}(pk, D)$. In an embodiment, encrypted data training program 112 stores the encrypted set of data $D_{enc}$ in database 114 on server 110.

In step 220, encrypted data training program 112 trains machine-learning model on the encrypted data using boosting algorithm. In an embodiment, encrypted data training program 112 trains a machine-learning model of the cloud computing environment on the encrypted data using a boosting algorithm as shown in FIG. 3. In an embodiment, encrypted data training program 112 trains a machine-learning model of server 110 on the encrypted set of data $D_{enc}$. In an embodiment, encrypted data training program 112 trains a weak classifier, e.g., logistic regression or a decision tree with depth of one, on a set of encrypted data. In an embodiment, encrypted data training program 112 trains a classifier $W_i$ on the encrypted set of data $D_{enc}$. In an embodiment, encrypted data training program 112 trains the machine-learning model or classifier using a boosting algorithm, i.e., adapting boosting, gradient boosting, and/or voting method. Embodiments utilizing adapting boosting and gradient boosting are described after step 260 below.

In step 230, encrypted data training program 112 performs classification on encrypted data. In an embodiment, encrypted data training program 112 performs a classification using the trained machine-learning model as shown in FIG. 3. In an embodiment, encrypted data training program 112 performs a classification using the trained machine-learning model or classifier on the set of encrypted data $D_{enc}$. In an embodiment, encrypted data training program 112 receives the results of the classification from the trained machine-learning model or classifier. In an embodiment, encrypted data training program 112 receives shuffled, encrypted results of the classification from the trained machine-learning model or classifier, in which shuffled means the array of results have been permuted in a random manner or order. The random permutation order is known only to encrypted data training program 112 and not to the client ensuring that the true results are not revealed to the client.

In step 240, encrypted data training program 112 sends encrypted results to client. In an embodiment, encrypted data training program 112 sends the shuffled, encrypted results of the classification to the client as shown in FIG. 3. In an embodiment, encrypted data training program 112 sends the shuffled, encrypted results of the classification to client computing device 130. In an embodiment, encrypted data training program 112 sends the encrypted results of the classification with the order of the encrypted results randomly shuffled.

In step 250, encrypted data training program 112 receives boosting updates from client. In an embodiment, encrypted data training program 112 receives boosting updates from the client as shown in FIG. 3. In an embodiment, encrypted data training program 112 receives boosting updates from client computing device 130 in the form of boosting of sampling probabilities, refined target labels, etc. In an embodiment, encrypted data training program 112 receives boosting updates for the shuffled, encrypted results. In an embodiment, client through user interface 132 on client computing device 130 has received the encrypted results, decrypted the results, and generated the boosting updates to send back to server 110.

In step 260, encrypted data training program 112 applies the boosting updates. In an embodiment, encrypted data training program 112 applies the boosting updates from the client as shown in FIG. 3. In an embodiment, encrypted data training program 112 unshuffles the encrypted results from client computing device 130 by reversing the random permutation order from step 230 to obtain the encrypted results in their unshuffled order. In an embodiment, encrypted data training program 112 applies the boosting updates received from client computing device 130 to continue training the machine-learning model or classifier. Encrypted data training program 112 applies the boosting updates received according to the boosting algorithm used, which are described below. In an embodiment, responsive to encrypted data training program 112 applying the boosting updates, encrypted data training program 112 repeats step 230 through step 260 iteratively for a pre-defined number of iterations, in which the pre-defined number can be defined by a user through user interface 132. In an embodiment, responsive to encrypted data training program 112 applying the boosting updates, encrypted data training program 112 repeats step 230 through step 260 iteratively until i≤K, in which i refers to the current iteration number, and K refers to the total number of classifiers trained or the maximum number of iterations performed.

In an embodiment, encrypted data training program 112 uses an adaptive boosting algorithm. In step 210, encrypted data training program 112 receives the homomorphic encryption instance (sk, pk) KeyGen($\lambda$, $\tau$), the public key, and the set of encrypted data $D_{enc}$. In this embodiment, encrypted data training program 112 additionally receives weight function $$w(x) = \frac{1}{|D_{enc}|}$$

and K from client computing device 130. In step 220, encrypted data training program 112 trains a weighted classifier $W_i$ on the set of encrypted data $D_{enc}$ with respect to weights w. In step 230, encrypted data training program 112 performs classification on the set of encrypted data $D_{enc}$. In step 240, encrypted data training program 112 sends the encrypted results to client computing device 130. In step 250, encrypted data training program 112 receives updated weights ẃ(x) from the client, in which the client computes a misclassification rate $\delta_i$ and calculates updated weights using $ẃ(x)=w(x)e^{\delta_i*err(x)}$ where err(x) is 0 if the classification is correct and 1 if incorrect. In this embodiment, encrypted data training program 112 repeats step 230 through step 260 iteratively until i≤K.

In another embodiment, encrypted data training program 112 uses a gradient boosting algorithm. In step 210, encrypted data training program 112 receives the homomorphic encryption instance (sk, pk) KeyGen($\lambda$, $\tau$), the public key, and the set of encrypted data $D_{enc}$ stored as $D_{enc}=(X_{enc}, Y_{enc})$, in which $X_{enc}$ is an encrypted data point and $Y_{enc}$ an encrypted label of the data point. In this embodiment, encrypted data training program 112 additionally initiates target gradient $T=Y_{enc}$ and initiates the target model to be trained $f_0 \leftarrow \phi$. In step 220, encrypted data training program 112 trains a weighted classifier $W_i$ on ($X_{enc}$, T) denoted by $h_k^{enc}$. In step 230, encrypted data training program 112 performs classification which returns the target model to be trained after the $k^{th}$ iteration $f_k^{enc}=[f_k^{enc}(x)+h_k^{enc}(x)\forall x\in X_{enc}.]$. In step 240, encrypted data training program 112 sends the encrypted results to client computing device 130. In step 250, encrypted data training program 112 receives target gradients T from the client, in which the client decrypts $f_k^{enc}$ to obtain $f_k$, computes the gradient step (1) shown below, and encrypts $g_k^{enc}$=Encrypt(pk, $g_k$) and T=$g_k^{enc}$. In this embodiment, encrypted data training program 112 repeats step 230 through step 260 iteratively until k≤K.

$$g_{ik} \leftarrow -\left[\frac{\partial L(y_i, f(x_i))}{\partial f(x_i)}\right]_{f=f_{k-1}} \text{ for each } (x_i, y_i) \in D \quad (1)$$

In another embodiment, encrypted data training program 112 uses an adaptive boosting algorithm and server 110 is a private cloud environment. In step 210, encrypted data training program 112 receives the homomorphic encryption instance (sk, pk) KeyGen(λ, τ), the public key, and the set of encrypted data $D_{enc}$. In this embodiment, encrypted data training program 112 additionally initiates a secret weight function w on $D_{enc}$ domain and sets K, which is a hyperparameter for a number of classifiers trained. In step 220, encrypted data training program 112 trains a weighted classifier $W_i$ on the set of encrypted data $D_{enc}$ with respect to weights w. In step 230, encrypted data training program 112 performs classification on the set of encrypted data $D_{enc}$. In step 240, encrypted data training program 112 sends the shuffled encrypted results to client computing device 130. In step 250, encrypted data training program 112 receives results $\Delta(x)$ in shuffled order from the client, in which the client computes a misclassification rate $\delta_i$ and calculates $\Delta(x)=e^{\delta_i*err(x)}$ where err(x) is 0 if the classification is correct and 1 if incorrect. In step 260, encrypted data training program 112 un-shuffles the results and updates the weights vector w as w(x)←w(x)$\Delta$(x). In this embodiment, encrypted data training program 112 repeats step 230 through step 260 iteratively until i≤K.

Figure 4:
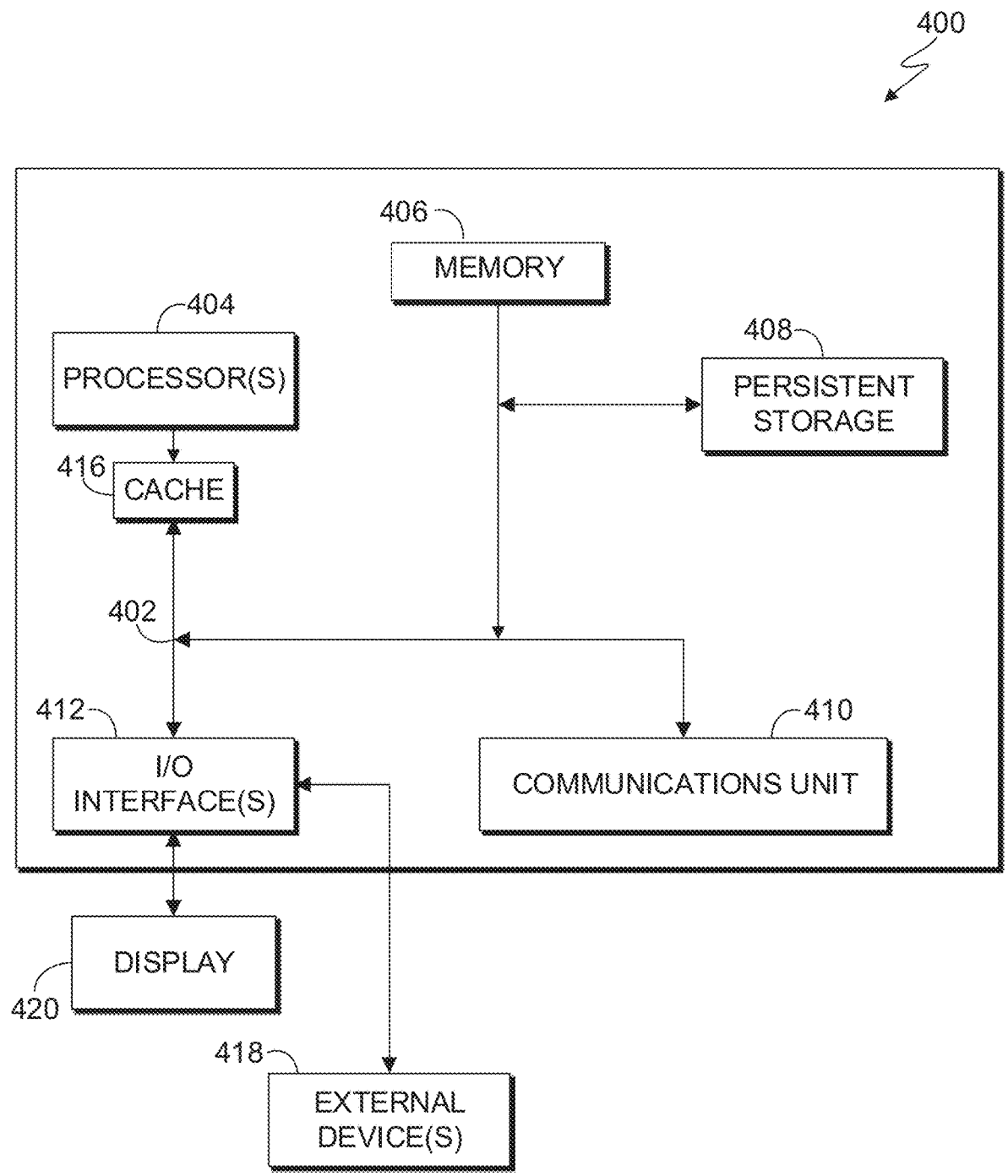
FIG. 4 depicts a block diagram of a computing device of distributed data processing environment, in accordance with an embodiment of the present invention.

FIG. 4 depicts a block diagram of computer 400 suitable for server 110 and client computing device 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Encrypted data training program 112 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs, such as encrypted data training program 112, may be downloaded to persistent storage 408 through communications unit 410.

I/O interface(s) 412 allows for input and output of data with other devices that may be connected to computing device 130 and server 110. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
  receiving, by one or more processors, a set of encrypted data from a client computing device;
  training, by the one or more processors, a machine-learning model using a boosting algorithm, wherein:
    the machine-learning model is stored on a cloud platform inaccessible by the client computing device; and
    the boosting algorithm is an ensemble meta-algorithm;

performing, by the one or more processors, a first classification on the set of encrypted data using the machine-learning model;
shuffling, by one or more processors, an order of an array of results of the performed first classification according to a random permutation order to generate a first set of encrypted results, wherein the random permutation order is unknown by the client computing device;
sending, by the one or more processors, the first set of encrypted results of the first classification to the client computing device;
receiving, by the one or more processors, a first set of boosting updates from the client computing device; and
applying, by the one or more processors, the first set of boosting updates to the machine-learning model, wherein applying the first set of boosting updates to the machine-learning model includes reversing the change to the order of the first set of encrypted results.

2. The computer-implemented method of claim 1, wherein the boosting algorithm is selected from the group consisting of an adaptive boosting algorithm and a gradient boosting algorithm.

3. The computer-implemented method of claim 1, wherein the one or more processors are a part of a cloud computing environment.

4. The computer-implemented method of claim 3, wherein the cloud computing environment is a private cloud platform.

5. The computer-implemented method of claim 1, further comprising:
performing, by the one or more processors, a second classification on the set of encrypted data using the machine-learning model;
sending, by the one or more processors, a second set of encrypted results of the second classification to the client computing device;
receiving, by the one or more processors, a second set of boosting updates from the client computing device;
applying, by the one or more processors, the second set of boosting updates to the machine-learning model; and
iteratively performing, by the one or more processors, the performing step, the sending step, the receiving step, and the applying step for a pre-defined number of iterations.

6. The computer-implemented method of claim 1, wherein the boosting updates comprise sampling probabilities.

7. The computer-implemented method of claim 1, wherein the boosting updates comprise refined target labels.

8. A computer program product comprising:
one or more non-transitory computer readable storage media and program instructions collectively stored on the one or more computer readable storage media, the program instructions comprising:
program instructions to receive a set of encrypted data from a client computing device;
program instructions to train a machine-learning model using a boosting algorithm, wherein:
the machine-learning model is stored on a cloud platform inaccessible by the client computing device; and
the boosting algorithm is an ensemble meta-algorithm;
program instructions to perform a first classification on the set of encrypted data using the machine-learning model;
program instructions to shuffle an order of an array of results of the performed first classification according to a random permutation order to generate a first set of encrypted results, wherein the random permutation order is unknown by the client computing device;
program instructions to send the first set of encrypted results of the first classification to the client computing device;
program instructions to receive a first set of boosting updates from the client computing device; and
program instructions to apply the first set of boosting updates to the machine-learning model, wherein the program instructions to apply the first set of boosting updates to the machine-learning model include program instructions to reverse the change to the order of the first set of encrypted results.

9. The computer program product of claim 8, wherein the boosting algorithm is selected from the group consisting of an adaptive boosting algorithm and a gradient boosting algorithm.

10. The computer program product of claim 8, where in the one or more computer readable storage media are a part of a cloud computing environment.

11. The computer program product of claim 10, wherein the cloud computing environment is a private cloud platform.

12. The computer program product of claim 8, further comprising:
program instructions to perform a second classification on the set of encrypted data using the machine-learning model;
program instructions to send a second set of encrypted results of the second classification to the client computing device;
program instructions to receive a second set of boosting updates from the client computing device;
program instructions to apply the second set of boosting updates to the machine-learning model; and
iteratively performing, by one or more processors, the performing step, the sending step, the receiving step, and the applying step for a pre-defined number of iterations.

13. A computer system comprising:
one or more computer hardware processors;
one or more non-transitory computer readable storage media;
program instructions collectively stored on the computer readable storage media for execution by at least one of the one or more processors, the program instructions comprising:
program instructions to receive a set of encrypted data from a client computing device;
program instructions to train a machine-learning model using a boosting algorithm, wherein:
the machine-learning model is stored on a cloud platform inaccessible by the client computing device; and
the boosting algorithm is an ensemble meta-algorithm;
program instructions to perform a first classification on the set of encrypted data using the machine-learning model;
program instructions to shuffle an order of an array of results of the performed first classification according to a random permutation order to generate a first set of encrypted results, wherein the random permutation order is unknown by the client computing device;
program instructions to send the first set of encrypted results of the first classification to the client computing device;

program instructions to receive a first set of boosting updates from the client computing device; and program instructions to apply the first set of boosting updates to the machine-learning model, wherein the program instructions to apply the first set of boosting updates to the machine-learning model include program instructions to reverse the change to the order of the first set of encrypted results.

14. The computer system of claim 13, wherein the boosting algorithm is selected from the group consisting of an adaptive boosting algorithm and a gradient boosting algorithm.

15. The computer system of claim 13, wherein the one or more computer readable storage media are a part of a private cloud platform.

16. The computer system of claim 13, further comprising:

program instructions to perform a second classification on the set of encrypted data using the machine-learning model;

program instructions to send a second set of encrypted results of the second classification to the client computing device;

program instructions to receive a second set of boosting updates from the client computing device;

program instructions to apply the second set of boosting updates to the machine-learning model; and iteratively performing, by one or more processors, the performing step, the sending step, the receiving step, and the applying step for a pre-defined number of iterations.

* * * * *